March 30, 1954  C. E. THOMES ET AL  2,673,582
WORK GAUGE FOR USE IN FORMING JOINTS
IN PATTERN OR LIKE SECTIONS
Filed Oct. 20, 1950  2 Sheets-Sheet 1

Inventors:
Charles E. Thomes,
William H. Norris,
by
Attorneys

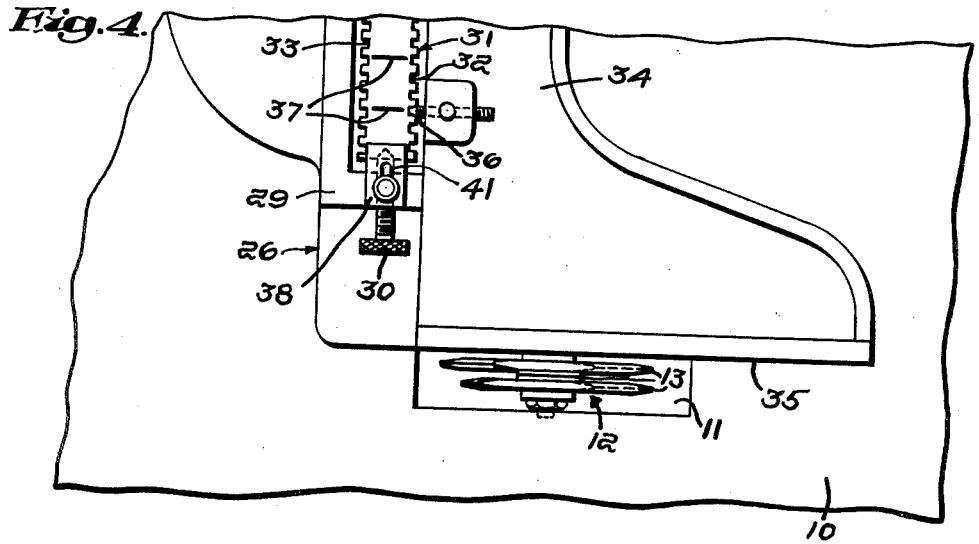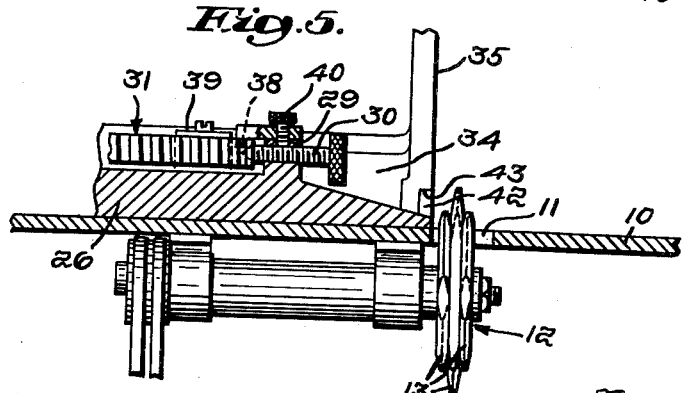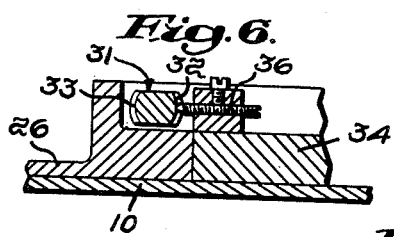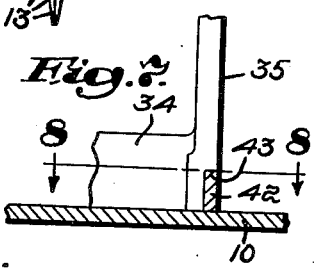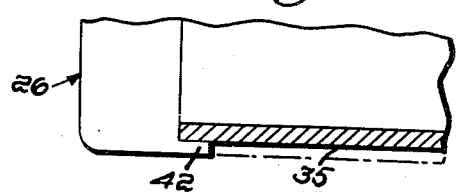

Patented Mar. 30, 1954

2,673,582

UNITED STATES PATENT OFFICE 2,673,582

WORK GAUGE FOR USE IN FORMING JOINTS IN PATTERN OR LIKE SECTIONS

Charles Edward Thomes and William H. Norris, Portland, Maine

Application October 20, 1950, Serial No. 191,286

7 Claims. (Cl. 144—253)

Our present invention relates to the formation of joints in pattern sections and particularly to a work gage to enable such joints to be formed with maximum accuracy and convenience.

In pattern making, the adjacent faces of various sections are provided with joint establishing portions to enable the pattern to be securely assembled. Such portions are formed by advancing the pattern sections against a cutter and such a cutter may include a plurality of transversely spaced cutting elements to provide, on a single pass, the formation of a plurality of joint portions. Difficulty is experienced in this operation in locating each section relative to the cutter so that joint portions formed therein will mate with complemental joint portions of another section to bring their surfaces flush. This necessity requires precise initial location of each section relative to the cutter, and, in addition, the joint portions of the pattern sections are usually of such length that additional passes thereof relative to the cutter are required so that the accurate jointing of pattern sections entails precise relocation of each section prior to each additional pass.

The principal objective of our invention is to provide means enabling patterns or like jointing to be easily and accurately performed. We accomplish that objective by providing a work gage comprising a guide slidably supported by the table for movements towards or away from the cutter along a predetermined path at one side thereof. Our guide has a rotatable rack disposed at right angles to that path and having oppositely disposed rack portions. Our gage also includes a member slidable at right angles to the guide and including a pattern section engaging face and a lock coacting with the teeth of one rack portion to hold that face in predetermined relationship to the cutter. The teeth of each rack portion are spaced apart in predetermined relationship to the cutter to enable the member to be accurately relocated to continue the formation of joint portions in a pattern section by another pass thereof relative to the cutter while the teeth of the rack portions are offset relative to each other to enable the relocation of the member for the accurate formation of complemental joint portions on another face of the same or another pattern section to be effected by turning the rack to effect corresponding coaction between the lock and the other rack portion.

In the accompanying drawings, we have shown an illustrative embodiment of our invention from which these and other of its novel features and advantages will be readily apparent.

In the drawings:

Fig. 4 is a fragmentary view, in elevation, showing our gage on an enlarged scale.

Figure 1:
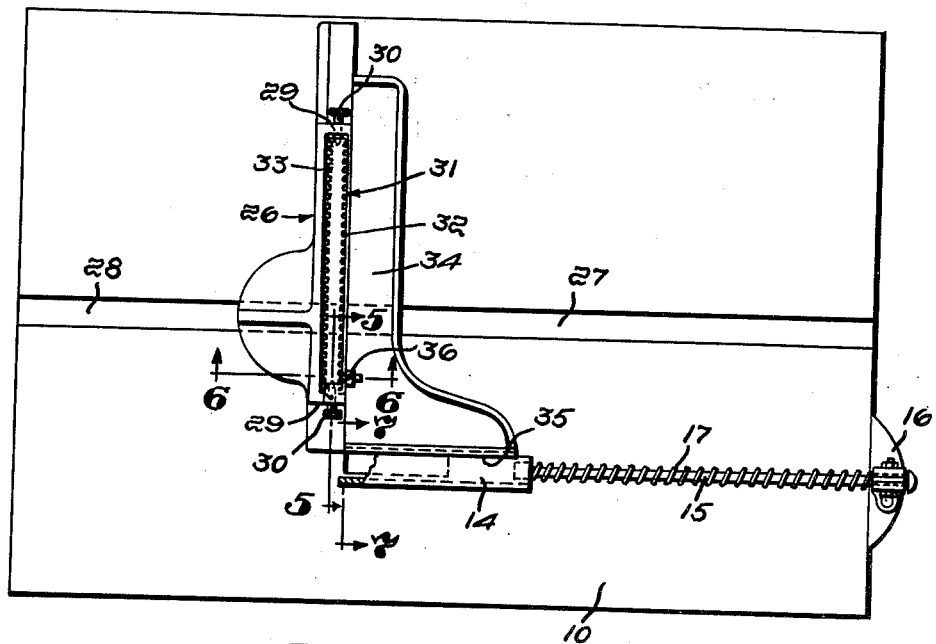
Fig. 1 is a top plan view of a work gage in accordance with our invention.

Figs. 5, 6, and 7 are sections along the lines 5—5, 6—6, and 7—7, respectively, of Fig. 4, and Fig. 8 is a section along the lines 8—8 of Fig. 7.

In the embodiment of our invention shown in the drawings, we have indicated at 10 a table having a slot 11 through which the cutter, generally indicated at 12, is exposed. While different types of cutters may be used, we prefer to employ a cutter 12 having a plurality of transversely spaced cutting elements 13. Such a cutter is normally shielded by a guard 14 having an arm 15 slidable in a support 16 and yieldably held in its operative position by a spring 17.

Figure 2:
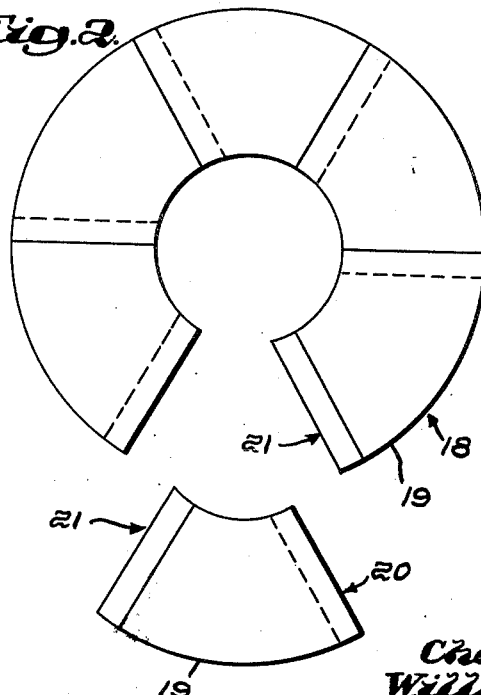
Fig. 2 is a similar view of an illustrative pattern.
Figure 3:
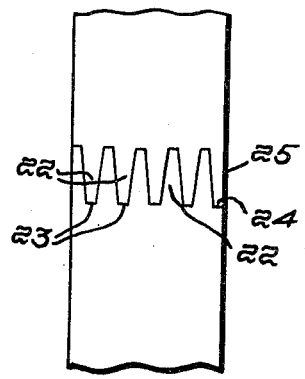
Fig. 3 is a fragmentary side view of the pattern shown in Fig. 2.

In Figs. 2 and 3, we have shown an illustrative pattern 18 consisting of sections 19 with each section having joint establishing portions, generally indicated at 20, and complemental joint establishing portions, generally indicated at 21.

Each such joint establishing portion, as may be seen in Fig. 3, includes a plurality of teeth 22 which are preferably spaced apart and have flat ends 23.

The cutter 12 is shown as having these cutting elements 13 and hence is capable of forming two complete teeth 22 and parts of two others on a single pass of a pattern section relative thereto. It is necessary, accordingly, to make a second pass of a pattern section to complete the joint establishing portions with the pattern sections shown in the drawings. To ensure accurate jointing, we have found it necessary to provide that the first pass establishes in the joint establishing portion 20, a shoulder 24 equal in width to a tooth end 23 and in the joint establishing portion 21, a parted tooth 25 having its end 23 of full width. It will be obvious that if the pattern section 19 is not accurately relocated either to complete one joint portion or to form a complemental joint portion, mating of the portions 20 and 21 will not result.

Our gage consists of a guide 26 having a slide 27 entrant of a slideway 28 enabling the guide 26 to be moved towards or away from the cutter 12 at one side thereof. The guide 26 has a pair of spaced supports 29 through each of which is threaded an adjustable supporting pivot 30 to rotatably support the rack, generally indicated at 31, at right angles to the slide 27. The rack 31 has oppositely disposed rack portions 32 and 33.

We provide a member 34 that is slidable relative to the guide 26 and has a face 35 engageable by a pattern section. The member 34 has a lock 36 which coacts with a rack portion to hold the member 34 in a predetermined position relative to the guide 26 as by entering between a pair of rack teeth.

In accordance with our invention the teeth of each rack portion are spaced apart in predetermined relation to the distance between each cutting element 13 and it is preferable that the spacing between each pair of such teeth is the same as that between adjacent cutting elements. The teeth of the rack portion 32 are offset relative to the teeth of the rack portion 33 so that by turning the rack 31 to disengage the lock 36 from the rack portion 32 and effecting its engagement between the corresponding pair of teeth of the rack portion 33, the member 34 is positively relocated with reference to the guide 26 to enable complemental joint portions to be established. For convenience, we provide the rack 31 with a series of markings 37 spaced apart, in the illustrative embodiment, by these rack teeth.

In position, the rack 31 has oppositely disposed flat surfaces between its rack portions on which the markings 37 are located and we employ releasable means to prevent rotation of the rack 31. As illustrative of such means, and as may be seen most clearly in Figs. 4 and 5, we provide a plate 38 having a rack engaging flange 39 and clamped to a support 29 as by a set screw 40 extending through the slot 41 so that when the set screw 40 is loosened, the plate 38 may be slid to disengage its flange 39 from the rack 31 thereby to enable it to be turned.

In order to prevent the member 34 from being slid, relative to the guide 26, into a position in which it could engage the cutter 12, we provide the guide 26 with a stop arm 42 disposed and dimensioned to enter into the shoulder defining recess 43 extending along the bottom edge of the face 35 of the member 34.

In using our gage, the member 34 is located relative and locked to the guide 26 to bring the surface of the pattern section 19 in which the joint portion is to be formed as closely into position as is possible by means of the lock 36 and the teeth of the adjacent rack portion. If necessary, the rack supporting pivots 30 may then be adjusted to ensure the precise disposition of the pattern section relative to the cutter 12 that is desired. The section is then advanced against the cutter and the operator then relocates the member 34 for a second pass to complete the joint portions by sliding the member 34 the necessary distance.

In forming the pattern 18 when the sections 19 are identical, one set of joint portions are first formed in all the sections. It is then only necessary to release the rack holding means and to turn the rack 31 to bring its other rack portion into position to be engaged by the lock 36 to ensure the accurate formation of the complemental set of joint portions in the pattern sections.

It will thus be apparent that our invention makes possible an easy, convenient, and accurate basis of the formation of matching joint portions in pattern or like sections.

What we therefore claim and desire to secure by Letters Patent is:

1. A work gage for use in cutting complemental joints in pattern sections or the like by means of a cutter having a plurality of transversely spaced cutting elements exposed through a slot in a table, said gage comprising a guide slidably supported by said table for movement towards or away from said cutter along a predetermined path at one side thereof and including a rotatable rack disposed at right angles to said path and including a pair of oppositely disposed rack portions, a member slidable at right angles to said path and including an end face engageable by the pattern section to position it accurately with reference to said cutter and a lock entrant between any pair of teeth of one rack portion, the teeth of said rack portion being spaced in predetermined relationship to the spacing of said cutting elements to facilitate the relocation of said member relative to said guide to enable the formation of joint portions in that section to be continued if its dimensions require a second pass relative to said cutter and the teeth of said rack portions being offset relative to each other to enable said member to be relocated for the formation of complemental joint portions by turning said rack to enable said lock to enter between the corresponding pair of teeth of the other rack portion, said lock being disconnected from said rack during the turning thereof.

2. A work gage for use in cutting complemental joints in pattern sections or the like by means of a cutter having a plurality of transversely spaced cutting elements exposed through a slot in a table, said gage comprising a guide slidably supported by said table for movement towards or away from said cutter along a predetermined path at one side thereof and including a pair of supports, a rack disposed at right angles to said path between said supports, and a rack supporting pivot threaded through each support, said rack including a pair of oppositely disposed rack portions, a member slidable at right angles to said path and including an end face engageable by the pattern section to position it accurately with reference to said cutter and a lock entrant between any pair of teeth of one rack portion, the teeth of said rack portion being spaced in predetermined relationship to the spacing of said cutting elements to facilitate the relocation of said member relative to said guide to enable the formation of joint portions in that section to be continued if its dimensions require a second pass relative to said cutter and the teeth of said rack portions being offset relative to each other to enable said member to be relocated for the formation of complemental joint portions by turning said rack to enable said lock to enter between the corresponding pair of teeth of the other rack portion, said lock being disconnected from said rack during the turning thereof.

3. A work gage for use in cutting complemental joints in pattern sections or the like by means of a cutter having a plurality of transversely spaced cutting elements exposed through a slot in a table, said gage comprising a guide slidably supported by said table for movement towards or away from said cutter along a predetermined path at one side thereof and including a rotatable rack disposed at right angles to said path, said rack including a pair of oppositely disposed rack portions, a member slidable on said table at right angles to said path and including an end face engageable by the pattern section to position it accurately with reference to said cutter and a lock entrant between any pair of teeth of one rack portion, releasable means carried by said guide to hold said rack against rotation when a rack portion is engaged by said lock, the teeth of said rack portion being spaced in predetermined relationship to the spacing of said cutting elements to facilitate the relocation of said member relative to said guide to enable the formation of joint portions in that section face to be continued if its dimensions require a second pass relative to said cutter and the teeth of said rack portions being offset relative to each other to enable said member to be relocated for the formation of complemental joint portions by turning said rack to enable said lock to enter between the corresponding pair of teeth of the other rack portion.

4. The work gage of claim 3 in which the guide includes a pair of supports between which the rack is rotatably supported, the rack has flat surfaces between its rack portions and the releasable means includes a slide engageable with one of the flat rack surfaces and movable out of engagement therewith when the rack is to be turned.

5. A work gage for use in cutting complemental joints in pattern sections or the like by means of a cutter having a plurality of transversely spaced cutting elements exposed through a slot in a table, said gage comprising a guide slidably supported by said table for movement towards or away from said cutter along a predetermined path at one side thereof and including a rotatable rack disposed at right angles to said path and including a pair of oppositely disposed rack portions, a member slidable at right angles to said path and including an end face engageable by the pattern section to position it accurately with reference to said cutter and a lock entrant between any pair of teeth of one rack portion, the teeth of said rack portion being spaced in predetermined relationship to the spacing of said cutting elements to facilitate the relocation of said member relative to said guide to enable the formation of joint portions in that section face to be continued if its dimensions require a second pass relative to said cutter and the teeth of said rack portions being offset relative to each other to enable said member to be relocated for the formation of complemental joint portions by turning said rack to enable said lock to enter between the corresponding pair of teeth of the other rack portion, said lock being disconnected from said rack during the turning thereof, and a plurality of markers on said rack, said markers being spaced apart a distance equal to the distance between the outer and inner cutting elements.

6. The gage of claim 5 in which the teeth of the rack portions are spaced apart a distance equal to the distance between adjacent cutting elements.

7. A work gage for use in cutting complemental joints in pattern sections or the like by means of a cutter exposed through a slot in a table, said gage comprising a guide slidably supported by said table for movement towards or away from said cutter along a predetermined path at one side thereof, a rotatable rack disposed at right angles to said path and including a pair of oppositely disposed rack portions, a member slidable at right angles to said path and including an end face engageable by the pattern section to position it accurately with reference to said cutter and a lock engageable with the teeth of one rack portion, the teeth of said rack portion being spaced in predetermined relationship to said cutter to facilitate the relocation of said member relative to said guide to enable the formation of joint portions in that section to be continued if its dimensions require a second pass relative to said cutter and the teeth of said rack portions being offset relative to each other to enable said member to be relocated for the formation of complemental joint portions by turning said rack to enable said lock to engage with corresponding teeth of the other rack portion, said lock being disconnected from said rack during the turning thereof.

CHARLES EDWARD THOMES.
WILLIAM H. NORRIS.

References Cited in the file of this patent
UNITED STATES PATENTS

| Number | Name | Date |
| --- | --- | --- |
| 131,932 | Boult | Oct. 8, 1872 |
| 1,574,445 | Robinson | Feb. 23, 1926 |
| 2,048,629 | Wallin | July 21, 1936 |
| 2,253,354 | Svensson | Aug. 19, 1941 |
| 2,342,700 | Schnitzer | Feb. 29, 1944 |
| 2,616,459 | Johnson | Nov. 4, 1952 |